United States Patent
Weston

(10) Patent No.: US 6,922,214 B1
(45) Date of Patent: Jul. 26, 2005

(54) VIDEO SIGNAL PROCESSING

(75) Inventor: Martin Weston, Petersfield (GB)

(73) Assignee: Snell & Wilcox Limited, Twickenham (GB)

(*) Notice: Subject to any disclaimer, the term of this patent is extended or adjusted under 35 U.S.C. 154(b) by 0 days.

(21) Appl. No.: 09/830,383

(22) PCT Filed: Nov. 3, 1999

(86) PCT No.: PCT/GB99/03641

§ 371 (c)(1),
(2), (4) Date: Apr. 25, 2001

(87) PCT Pub. No.: WO00/27109

PCT Pub. Date: May 11, 2000

(30) Foreign Application Priority Data

Nov. 3, 1998 (GB) .............................................. 9824061

(51) Int. Cl.⁷ ............................. H04N 7/01; H04N 5/14
(52) U.S. Cl. ....................................... 348/448; 348/700
(58) Field of Search ................................ 348/448, 452, 348/441, 439.1, 700, 910, 447; 360/46; 375/240.12

(56) References Cited

U.S. PATENT DOCUMENTS

| | | | |
|---|---|---|---|
| 4,733,297 A | | 3/1988 | Katsumata et al. |
| 4,789,893 A | * | 12/1988 | Weston ........................ 348/448 |
| 5,086,488 A | | 2/1992 | Kato et al. |
| 5,142,380 A | | 8/1992 | Sakagami et al. |
| 5,249,053 A | | 9/1993 | Jain |
| 5,291,280 A | | 3/1994 | Faroudja et al. |
| 5,317,398 A | | 5/1994 | Casavant et al. |
| 5,365,273 A | | 11/1994 | Correa et al. |
| 5,406,333 A | | 4/1995 | Martin |
| 5,438,625 A | | 8/1995 | Klippel |
| 5,444,493 A | * | 8/1995 | Boie ........................... 348/448 |
| 5,473,383 A | * | 12/1995 | Sezan et al. ................. 348/452 |
| 5,512,956 A | | 4/1996 | Yan |
| 5,606,464 A | * | 2/1997 | Agazzi et al. ................. 360/46 |
| 5,629,779 A | | 5/1997 | Jeon |
| 5,642,115 A | | 6/1997 | Chen |
| 5,671,298 A | | 9/1997 | Markandey et al. |
| 5,748,245 A | | 5/1998 | Shimizu et al. |
| 5,802,218 A | | 9/1998 | Brailean |
| 5,812,197 A | | 9/1998 | Chan et al. |
| 5,831,688 A | | 11/1998 | Yamada et al. |
| 5,930,398 A | | 7/1999 | Watney |
| 5,982,444 A | | 11/1999 | Kato et al. |
| 5,991,456 A | | 11/1999 | Rahman et al. |
| 6,005,952 A | | 12/1999 | Klippel |
| 6,151,362 A | | 11/2000 | Wang |
| 6,163,573 A | | 12/2000 | Mihara |

(Continued)

FOREIGN PATENT DOCUMENTS

| | | |
|---|---|---|
| EP | 0 343 728 A1 | 11/1989 |
| EP | 0685968 | 12/1995 |
| EP | 0720367 | 7/1996 |
| WO | WO99/20046 | 4/1999 |
| WO | WO99/51028 | 10/1999 |
| WO | WO99/63747 | 12/1999 |
| WO | WO00/27109 | 5/2000 |

OTHER PUBLICATIONS

Patent Abstracts of Japan, Publication No. 58050863, Publication Date Mar. 25, 1983, Applicant Matsushita Electric Inc Co Ltd.

*Primary Examiner*—Gims Philippe
(74) *Attorney, Agent, or Firm*—Michael Best & Friedrich LLP

(57) ABSTRACT

Motion between adjacent fields of an interlaced video signal is analyzed by vertically interpolating the current field to produce a line signal which corresponds in vertical position with lines from the succeeding and preceding fields; and subtracting the signals to provide a field difference. The effect of vertical detail is reduced by comparing two field differences or by subtracting a local or global detail signal from the field difference.

25 Claims, 7 Drawing Sheets

U.S. PATENT DOCUMENTS

| | | | |
|---|---|---|---|
| 6,233,018 B1 * | 5/2001 | Thomas | 348/452 |
| 6,266,092 B1 * | 7/2001 | Wang et al. | 348/448 |
| 6,269,120 B1 | 7/2001 | Boice et al. | |
| 6,278,735 B1 | 8/2001 | Mohsenian | |
| 6,285,716 B1 | 9/2001 | Knee et al. | |
| 6,437,827 B1 | 8/2002 | Baudouin | |
| 6,539,120 B1 | 3/2003 | Sita et al. | |
| 6,570,922 B1 | 5/2003 | Wang et al. | |
| 2001/0031009 A1 | 10/2001 | Knee et al. | |

* cited by examiner

VIDEO SIGNAL PROCESSING

BACKGROUND OF THE INVENTION

This invention relates to video signal processing and in an important example to improved methods of processing television signals which have been derived from cinema film, or other camera processes having a temporal sampling rate lower than the field rate of the television system. The invention also relates more generally to the detection of motion in a video signal.

There are several processes in which two or more fields of a television signal are arithmetically combined to provide a filtered or interpolated output signal. Examples include geometric transformation of the picture for special effects, aspect-ratio conversion, composite decoding and standards conversion. These processes can give rise to undesirable artefacts when the fields that are combined differ significantly because of motion, or cuts between different scenes. When the temporal sampling rate of the camera is less than the field rate of the television system the opportunity arises to modify the processing so that only fields corresponding to the same instant in time are combined.

A particularly important example of the problem is the televising of film shot at 24 frames per second at a field rate of 60 fields per second. It is common practice to create a sequence of five television fields from two film frames by alternately generating two and three fields respectively from successive film frames. This is known as the "3:2 pull-down" technique. Techniques have been developed for identifying the duplicated fields by comparing fields one frame apart and analysing the resulting pattern to derive a film sequence signal. Reference is directed in this respect to U.S. Pat. Nos. 4,881,125; 4,982,280; 4,998,287 and 5,255,091.

A difficulty with prior art techniques is that they rely on analysing data from many frames of video to identify characteristic patterns. Unless there is considerable delay built into the system, it is difficult to react quickly to changes in temporal phase.

When film shot at 24 frames per second is televised at a field rate of 50 fields per second, the so-called 2:2 technique is employed. Here, every film frame is used to provide two video fields and the tape or film transport speed is modified to change the resulting 48 fields per second signal into the required 50 fields per second. There remains a need to identify in the video signal, which fields originate from the same film frame.

Many processes which combine fields are arranged to operate either in a "video mode" where each field is assumed to correspond to a different moment in time, or a "film-mode" where successive fields may correspond to the same moment in time. It is therefore useful to create a film/video control signal and, in order to modify processes which combine fields inappropriately, it is helpful to derive a signal which indicates when a change in the "temporal phase" of the picture, or a cut to a new scene, occurs.

A proposal has been made to detect motion between interlaced video fields to provide a field motion signal: see U.S. Pat. No. 5,291,280. In this proposal, a signal formed by subtracting across a field delay is compared with a signal formed by subtracting across a delay of a field less one line. After filtering, rectifying and thresholding, the smaller of these two signals is taken as the field motion signal.

Interpreting a difference taken across a field delay is complicated by the common practice of interlaced television scanning. The lines of successive fields are vertically misaligned by one line pitch and so, where vertical detail exists, the magnitude of the difference signal will not fall to zero, even if the fields correspond to the same scene and temporal phase.

It is an object of this invention to provide improved method and apparatus that overcome certain shortcomings of the prior art.

SUMMARY OF THE INVENTION

Accordingly, the present invention consists, in one aspect, in a method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail.

Preferably, a component in the field difference signal which arises from vertical detail is removed by taking a measure of vertical detail from one or both of the fields and subtracting either all or a proportion of the detail measure from the field difference signal.

Suitably, a component in the field difference signal which arises from vertical detail is removed by comparing a first field difference signal provided for a current field and the immediately preceding field with a second field difference provided for a current field and the immediately succeeding field.

In another aspect, the present invention consists in a method of creating a field difference signal by subtracting video signals from different fields characterised in that one or both of the fields are vertically interpolated prior to subtraction by taking weighted sums of lines from within the same field so as to obtain signals corresponding to similar vertical positions.

In yet another aspect, the present invention consists in a video filter process in which an output is created by taking a weighted sum of contributions over a filter aperture which defines the lines and fields from which a contribution is to be taken and the weighting of each contribution; comprising the steps of vertically interpolating one or more input fields to produce respective signals for at least two input fields which correspond in vertical position; subtracting the signals to provide a field difference signal for at least one pair of adjacent input fields; and utilising the or each field difference signal to select a filter aperture.

In still a further aspect, the present invention consists in a method of automatically changing the operation of a video process between a film mode in which adjacent fields are assumed to correspond to the same point in time and a video mode in which adjacent fields are assumed to correspond to different points in time, comprising the steps of vertically interpolating one or more fields to produce respective signals for at least three input fields which correspond in vertical position; subtracting the signals to provide a preceding field difference signal for the pair of fields comprising a current field and a preceding field and a succeeding field difference signal for the pair of fields comprising the current field and a succeeding field least one pair of adjacent input fields; comparing the preceding field difference signal with the succeeding field difference signal and changing the selection to film mode if the field difference signals are significantly different, and changing the selection to video mode if both signals are similar but not small.

The invention will now be described by way of example with reference to the accompanying drawings in which:

DETAILED DESCRIPTION OF THE INVENTION

Figure 1:
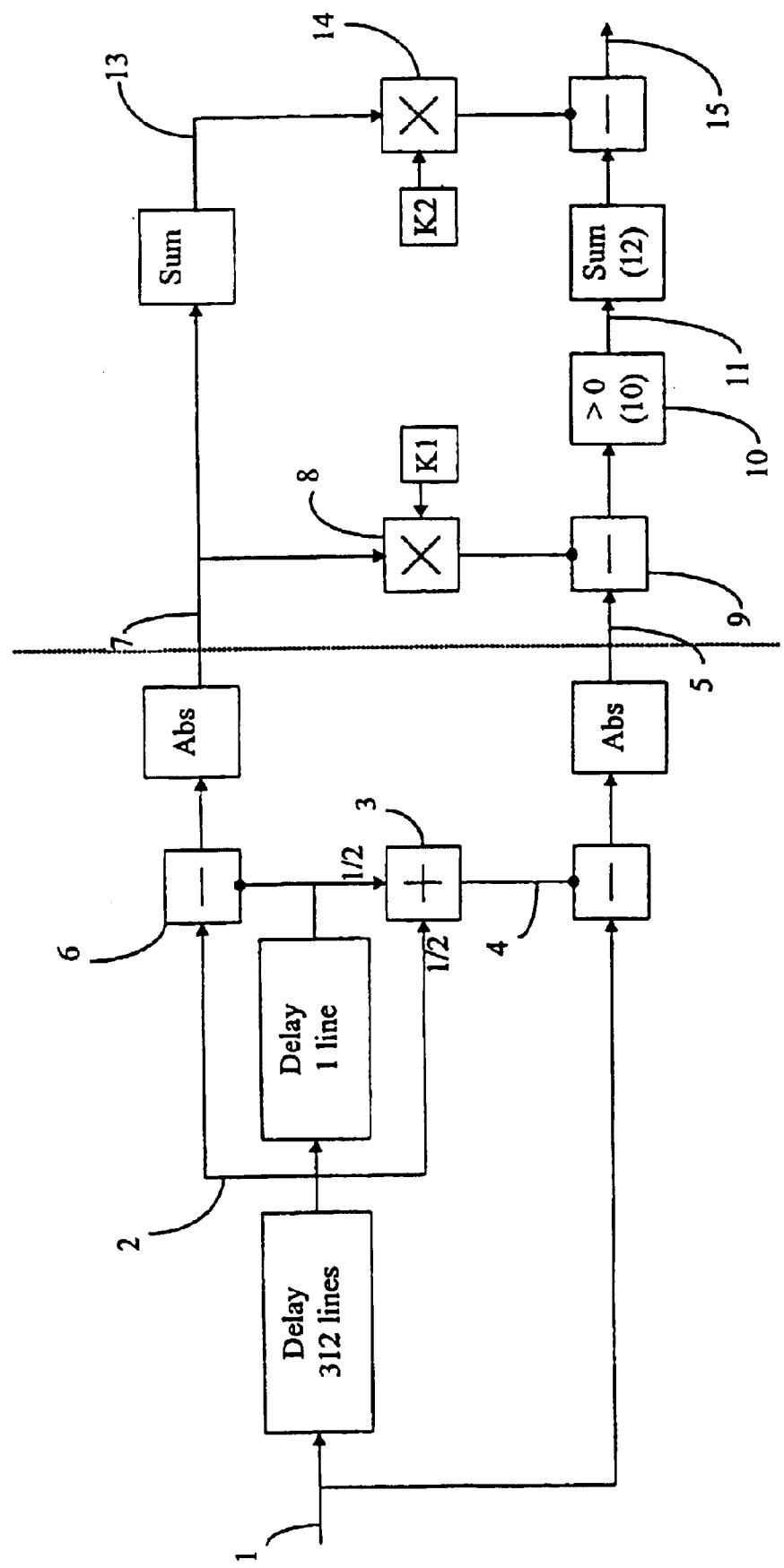
FIG. 1 is a block diagram of a system according to one embodiment of the present invention for generating a film difference signal from a 625-line interlaced television signal.

Referring to FIG. 1: An interlaced, 625-line input video signal (1) is delayed by 312 lines to produce video signal (2) corresponding to the previous field. This signal is interpolated by averaging (3) across a one-line delay so as to make a signal (4) corresponding to the same vertical position as the (interlaced) current input line. This is subtracted from the input signal and the absolute value of the result taken to give an uncorrected field difference signal (5) having a magnitude which increases with the difference in content between the current and previous fields.

Figure 3:
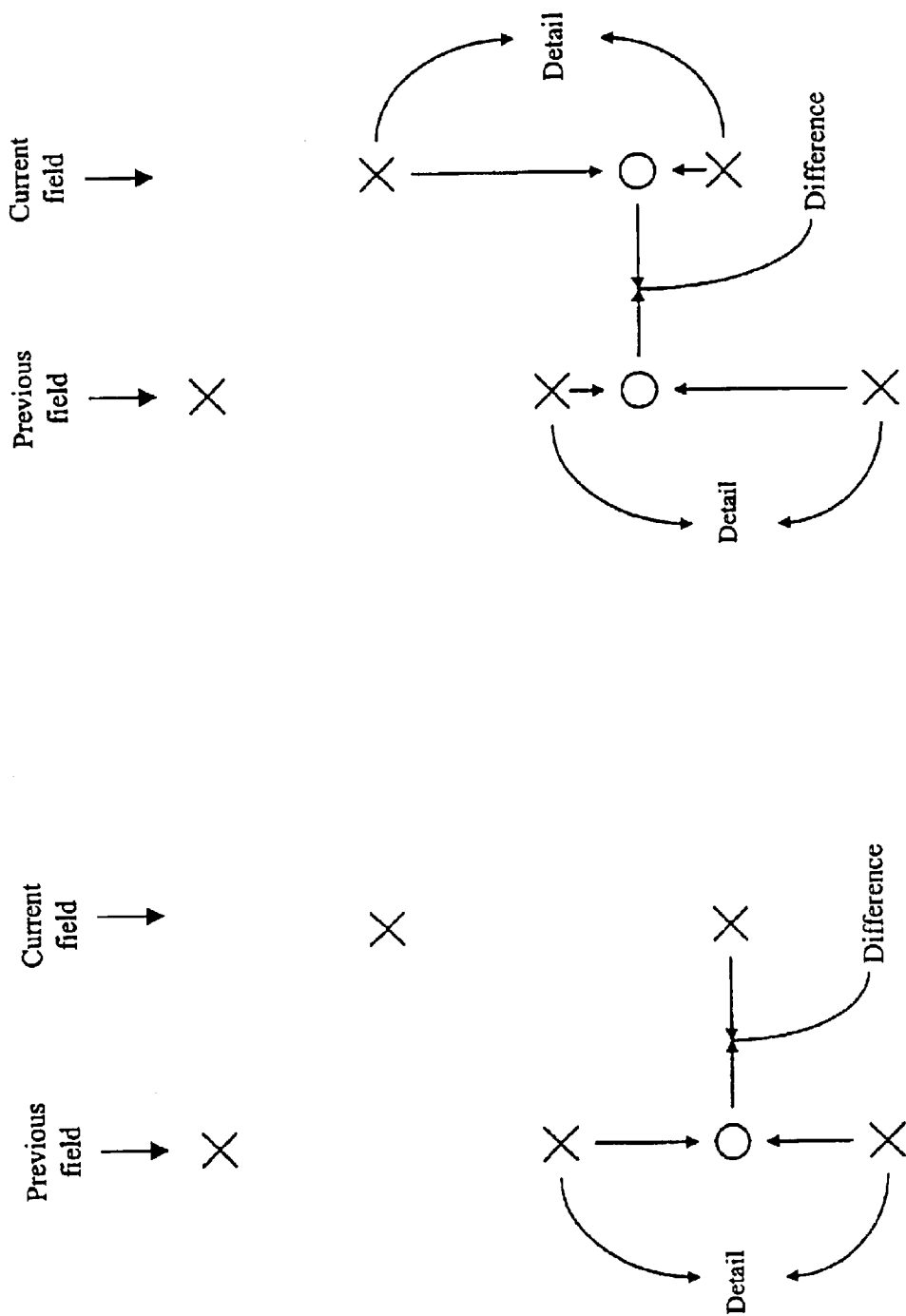
FIG. 3a is a diagram showing how a signal from the previous field can be interpolated to give a signal corresponding to the vertical position of the current field.
FIG. 3b is a diagram showing how signals from both the current and the previous fields can be interpolated to bring them into alignment with each other.

The vertical interpolation of the previous field to align it with the current field is shown diagrammatically in FIG. 3a. The lines of the current and previous fields are indicated by crosses, and their relative vertical positions are indicated by their vertical positions on the diagram. The position of the interpolated line is shown by a circle.

Returning to FIG. 1, a local measure of the vertical detail in the previous field (7) is taken by subtracting (6) across the one-line delay and taking the absolute value of the result. This is multiplied (8) by a constant k1, which is chosen to optimise the operation of the circuit. A suitable value for k1 may be in the region of 0.5.

The resulting local detail correction signal is subtracted (9) from the uncorrected field difference signal and clipped (10) in a threshold circuit which replaces values which are more negative than a predetermined threshold by the value of the threshold. This corrected field difference signal (11) can be used to find cuts or changes in temporal phase of the incoming video.

The signal 11 can be further improved by integrating over all, or a substantial part, of the picture area (12) to make a global difference signal, and carrying out a similar process on the local detail signal (7) to make a global detail signal (13). This is multiplied (14) by a constant k2 (which determined in a similar way as k1) and subtracted from the global difference signal to generate an improved field difference signal 15.

Figure 2:
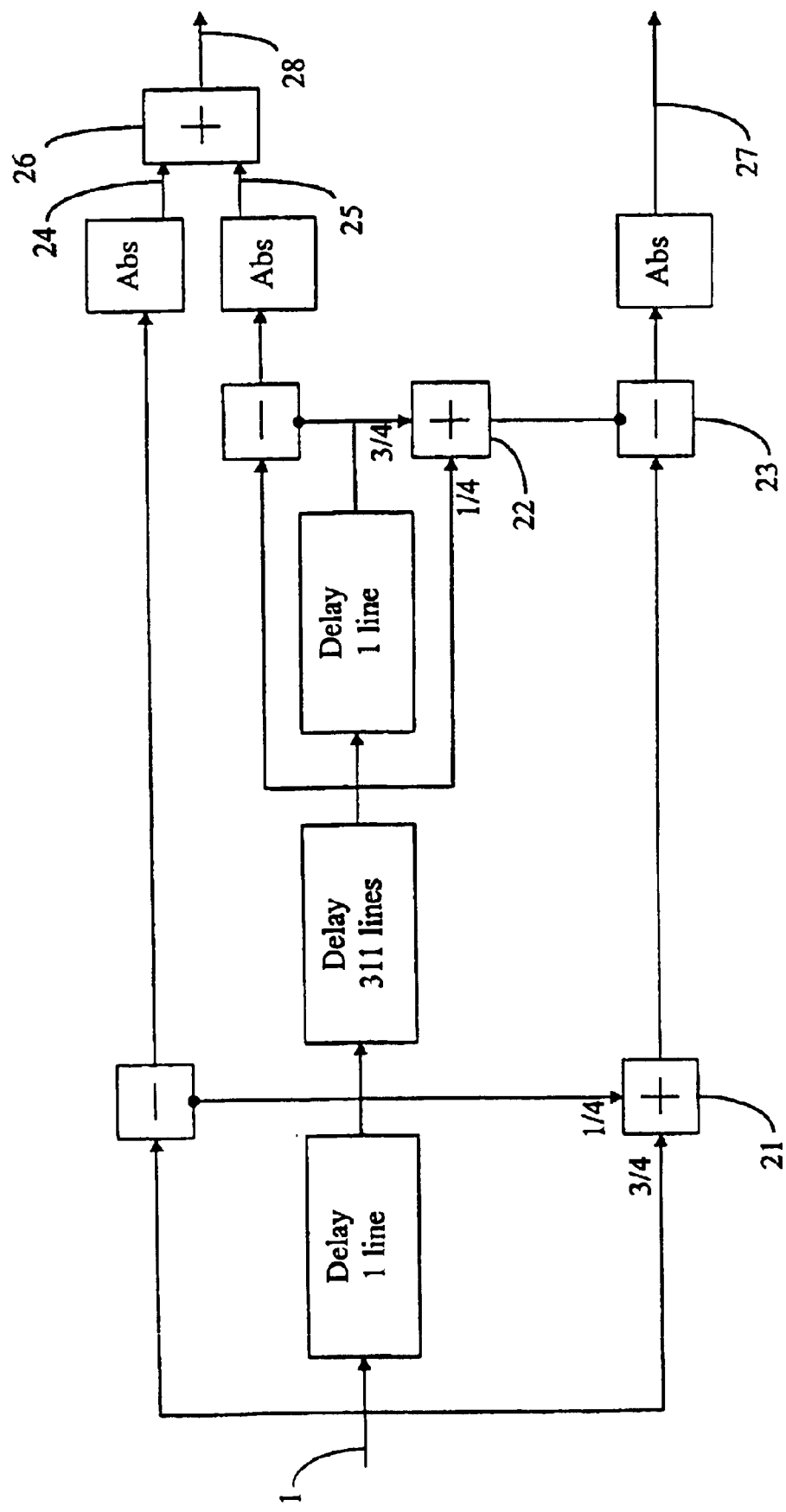
FIG. 2 is a diagram similar to FIG. 1 illustrating a modification.

Another way of generating the uncorrected field difference signal and the local detail signal is shown in FIG. 2.

The input 625-line interlaced video signal (1) is interpolated (21) to produce a signal which is vertically shifted by half of one (picture) line pitch. A second interpolator (22) applies an equal shift in the opposite direction to the signal from the previous field. The two interpolated signals are subtracted (23) and the absolute value of the result taken to obtain an improved local difference signal 27.

The interpolation of the two signals to bring them into vertical alignment is shown diagrammatically in FIG. 3b.

Because the interpolation processes need signals from more than one line from the current and the preceding field (two from each in the example shown in FIG. 2), it is possible to generate local detail signals from each of these fields (24 and 25) by taking the absolute values of vertical difference signals. The two local detail signals are averaged (26) and the result used to correct the improved local difference signal 27.

The local detail signal 28 and the local difference signal 27 can replace the signals 7 and 5 respectively in FIG. 1 and be processed as shown on the right hand side of the figure to create an improved field difference signal.

Although the detail correction which has been described above considerably reduces the adverse effect of detail on the field difference signal, it does not eliminate it completely and further processing will now be described making use of the film sequence signals from more than one field at a time.

Figure 4:
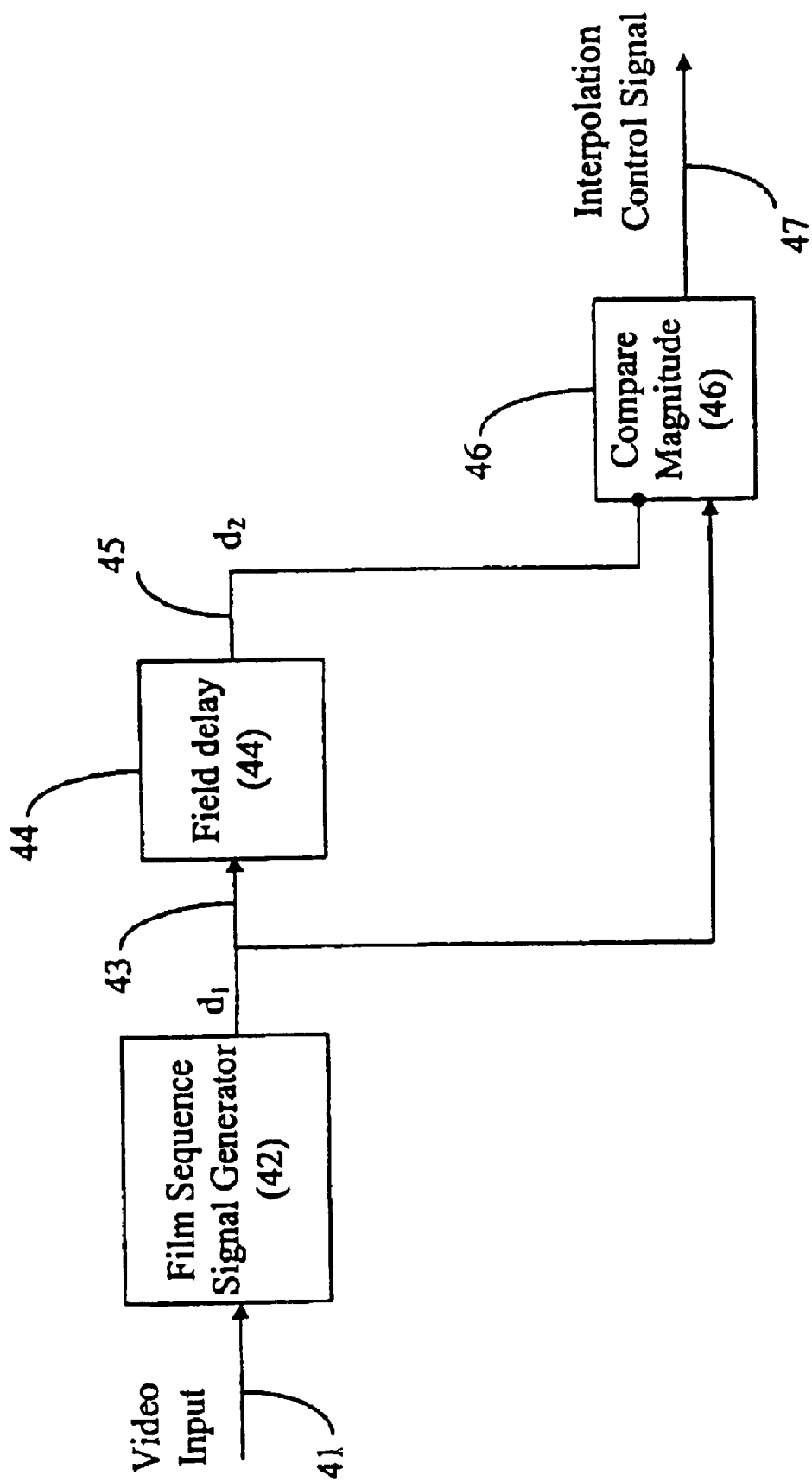
FIG. 4 is a block diagram of a system according to one embodiment of the present invention for generating an interpolation control signal.

In many applications there is a need to use a field difference signal to control whether the current field is combined with the previous field or with the next field. The generation of a suitable control signal is shown in FIG. 4. A video signal (41) is input to a film sequence signal generation process (42), which may, for example, be that shown in FIG. 1, and a film sequence signal (43) obtained which gives a measure of the temporal difference between two fields. This signal is delayed by substantially one field in a suitable delay device (44) to obtain a measure of the temporal difference between the two previous fields (45). A magnitude comparison is made (46) between the input and the output of the delay device and the resulting signal (47) is used to control an interpolation process as follows:

Let us describe the field which is being input to the block (42) as the next field. The film sequence signal (43) corresponds to the temporal difference between this field and the current field and the delayed sequence signal (45) corresponds to the temporal difference between the current field and the previous field. When the signal (47) indicates that the magnitude of the undelayed film sequence signal (43) is significantly greater that of the delayed film sequence signal (45) the interpolation process combines the current field with the previous field; otherwise the current field is combined with the next field.

Figure 5:
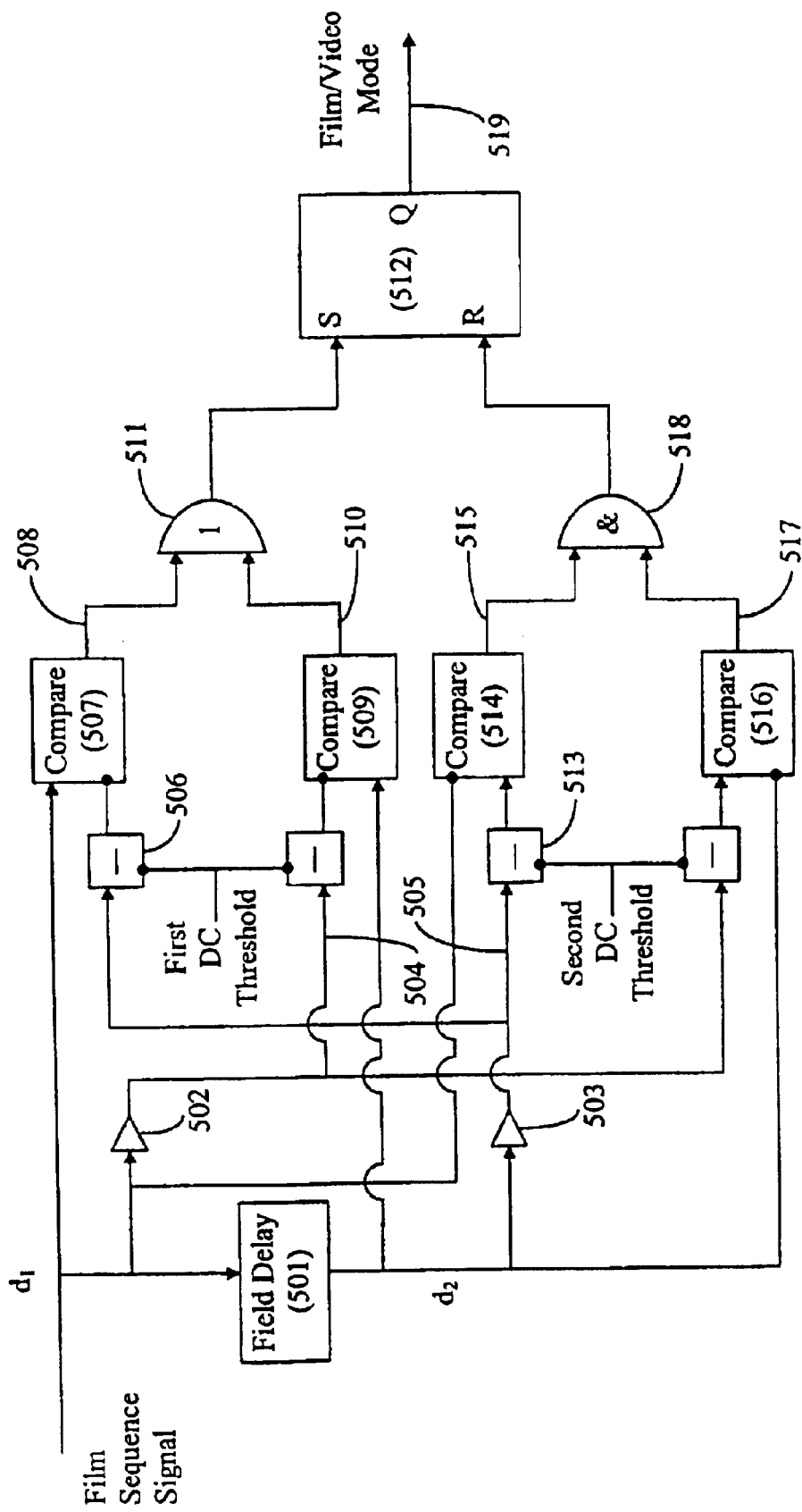
FIG. 5 shows block diagram of a system according to one embodiment of the present invention for identifying film or video material.

Most applications which make use of film sequence information also have a video mode and it is helpful for the mode selection to be automatic. This may be achieved by processing a film sequence signal as shown in FIG. 5.

A film sequence signal indicating the magnitude of the temporal difference between successive fields $d_1$ is delayed by substantially one field in the delay device (501) to produce a delayed film sequence signal $d_2$. The signals $d_1$ and $d_2$ are fed to amplifiers (502) and (503) respectively to obtain amplified film sequence signals (504) and (505). The gains of the amplifiers are substantially equal at a value chosen to optimise the operation of the system; a gain of approximately two times has been found to be satisfactory.

The delayed and amplified signal (505) has a first DC threshold value subtracted from it in the subtractor (506) and $d_1$ is compared with the result in the comparator (507) to produce a logic signal (508) which is active when $d_1$ is the greater. The comparator (509) performs an equivalent process, but with the roles of $d_1$ and $d_2$ reversed, to produce a logic signal (510). These two logic signals are combined in an OR-gate (511) and the result fed to the SET input of a latch (512).

The effect of this processing is to set the latch whenever there are significant differences between the delayed and undelayed film sequence signals.

The delayed and amplified film sequence signal (505) has a second DC threshold subtracted from it in the subtractor (513) and the result is compared with $d_1$ in the comparator (514) to produce a logic signal (515) which is active when $d_1$ is the smaller. The comparator (516) performs an equivalent process, but with the roles of $d_1$ and $d_2$ reversed, to produce a logic signal (517). These two logic signals are combined In an AND-gate (518) and the result fed to the RESET input of the latch (512).

The effect of this processing is to reset the latch whenever the delayed and undelayed film sequence signals are of similar magnitude and greater than the magnitude of the second DC threshold.

The output (519) from the latch is used to put a video process into film mode when it is active, and to change to video mode when it is not.

Figure 6:
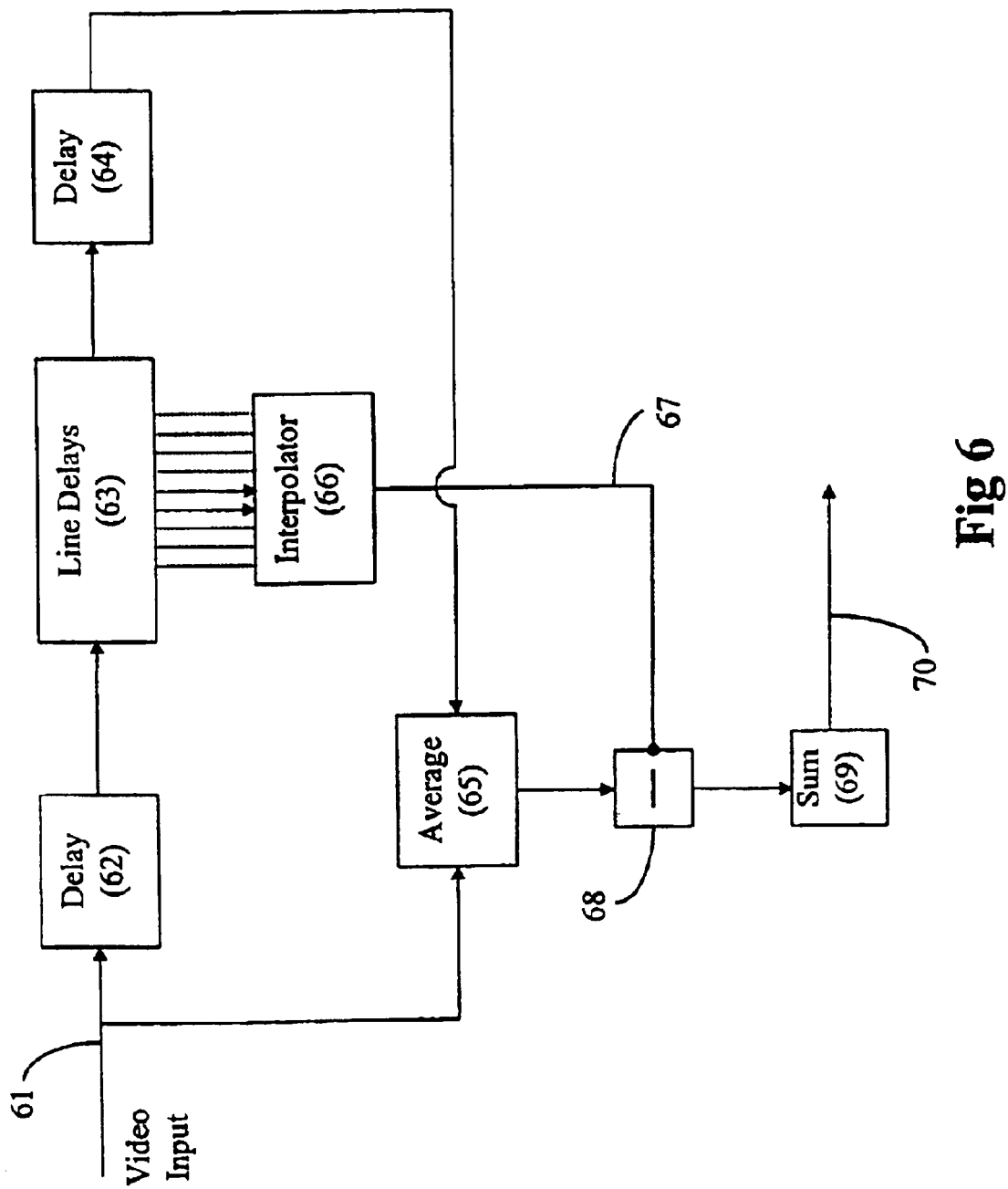
FIG. 6 shows the generation of an alternative global detail signal.

Experience has shown that for some, very sharp pictures the methods of detail correction described above are insufficient to prevent stationary film images from being falsely detected as video. This difficulty can be overcome by generating an improved detail signal as shown in FIG. 6.

An input video signal (61) is delayed a total of two fields by the delay elements (62), (63) and (64) and the undelayed and the two-field-delayed signals are averaged (65). An interpolator (66) uses two or more contributions from the line delays (63) to create an interpolated field signal (67) which is aligned with the average signal. The subtractor (68) subtracts the interpolated signal from the average signal to create a detail signal which is integrated (69) over all, or a substantial part, of the picture area to create an improved global detail signal (70).

This improved global detail signal can replace the signal (13) In FIG. 1, or a combination of the improved signal and the signal (13) can be used to correct the global difference signal.

It has been recognised by the inventor that a component in a field difference signal which arises from vertical detail can be removed, not only by subtracting an explicit detail signal but also by comparing field difference signals from neighbouring pairs of fields which can be assumed to have similar amounts of vertical detail.

Figure 7:
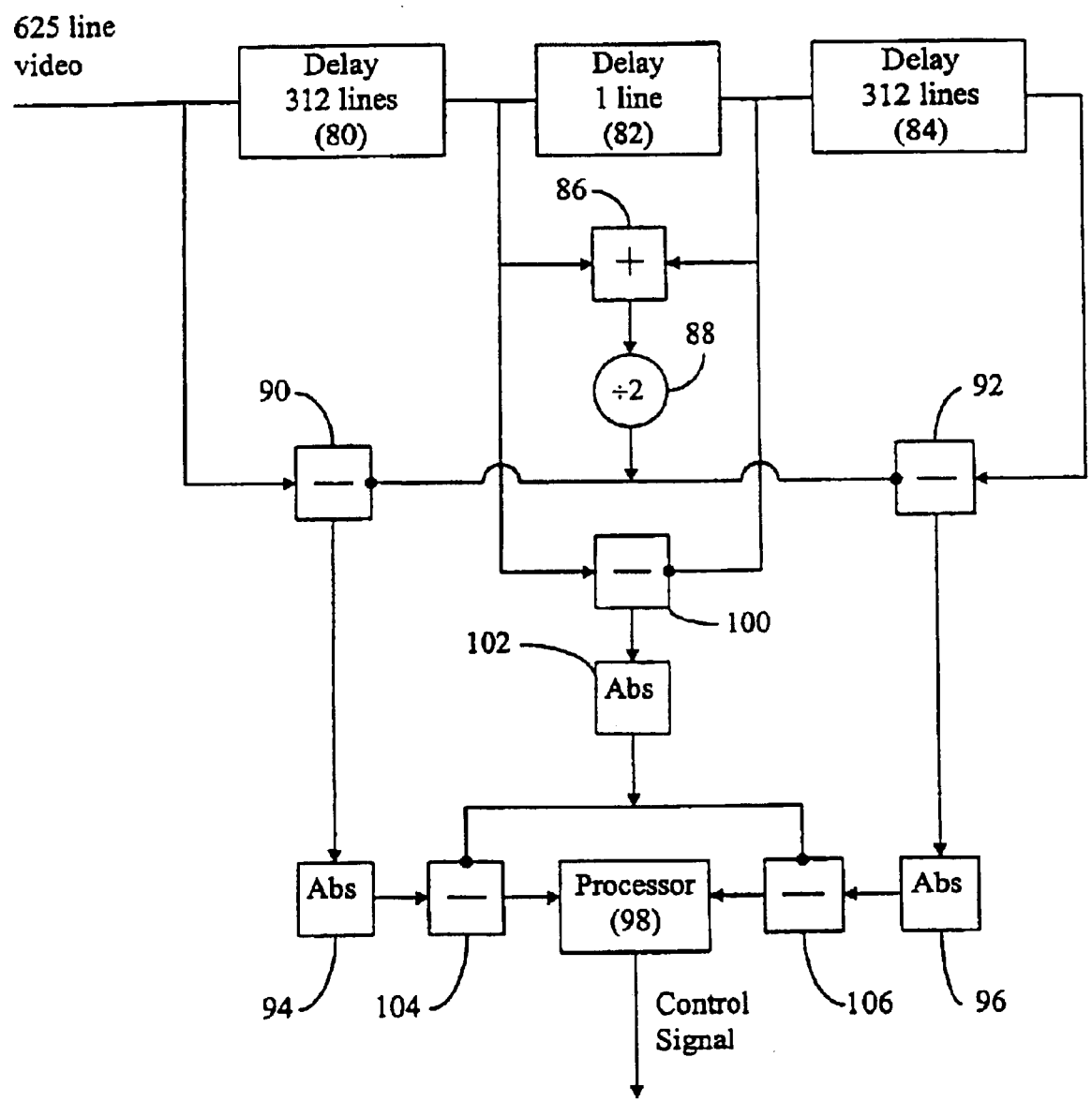
FIG. 7 is a block diagram of a system according to a further embodiment of the present invention.

Thus, turning to FIG. 7, there is shown an arrangement in which an input interlaced 625 line video signal is passed through a 312 line delay (80), a 1 line delay (82) and a further 312 line delay (84).

Signals taken across the line delay (82) are added at (86) and halved at (88) to provided an interpolated signal which correspond in vertical position with lines from the succeeding and preceding fields. Preceding and succeeding field differences are taken in subtractors (90) and (92) and the absolute values taken in blocks (94) and (96). The resulting signals are made available to processor (98) which as described above can determine which of the preceding or succeeding fields has the lowest field difference. This determination can be made pixel by pixel or signals can be appropriately aggregated over a region of a field or an entire field.

If it is desired also to distinguish between "true" video and film originating video, a signal can be taken from subtractor (100) across the line delay (82) providing a local measure of vertical detail. The absolute value of this detail signal from block (102) is then subtracted at (104) and (106) from the respective field difference signals. A determination can then be made of whether a multiple (which may be 2) of one detail corrected difference signal exceeds the other by a predetermined threshold.

Although the invention has been described in terms of 625-line, interlaced signals, it will be appreciated by those skilled in the art that it is applicable to other formats, including 525-line and high-definition formats.

The field difference signals that this invention provides can be used to controls a wide variety of video processes, including standards conversion, up or down conversion, aspect ratio conversion, special effects generators, composite decoders and compression encoders and decoders.

What is claimed is:

1. A method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail.

2. A method according to claim 1 in which a component in the field difference signal which arises from vertical detail is removed by taking a measure of vertical detail from one or both of the fields and subtracting either all or a proportion of the detail measure from the field difference signal.

3. A method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail by taking a measure of vertical detail from one or both of the fields and subtracting either all or a proportion of the detail measure from the field difference signal, in which a measure of local detail is used to correct the field difference signal.

4. A method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail by taking a measure of vertical detail from one or both of the fields and subtracting either all or a proportion of the detail measure from the field difference signal, in which a measure of global detail is derived by summing the local detail from one or both fields over all or a substantial part of the picture and all or a proportion of the global detail signal is used to correct the field difference signal.

5. A method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail, in which a component in the field difference signal which arises from vertical detail is removed by comparing a first field difference signal provided for a current field and the immediately preceding field with a second field difference provided for a current field and the immediately succeeding field.

6. A method of creating a field difference signal by subtracting video signals from different fields characterised in that one or both of the fields are vertically interpolated prior to subtraction by taking weighted sums of lines from within the same field so as to obtain signals corresponding to similar vertical positions.

7. A method according to claim 6 in which the result of subtraction is corrected by taking a measure of vertical detail from one or both of the fields and either all or a proportion of the detail measure is subtracted from the field difference signal.

8. A method of creating a field difference signal by subtracting video signals from different fields characterised in that one or both of the fields are vertically interpolated prior to subtraction by taking weighted sums of lines from within the same field so as to obtain signals corresponding to similar vertical positions, and correcting the result of subtraction by taking a measure of vertical detail from one or both of the fields and either all or a proportion of the detail measure is subtracted from the field difference signal, in which a measure of local detail is used to correct the field difference signal.

9. A method of creating a field difference signal by subtracting video signals from different fields characterised in that one or both of the fields are vertically interpolated prior to subtraction by taking weighted sums of lines from within the same field so as to obtain signals corresponding to similar vertical positions, and correcting the result of subtraction by taking a measure of vertical detail from one or both of the fields and either all or a proportion of the detail measure is subtracted from the field difference signal in which a measure of global detail is derived by summing the local detail from one or both fields over all or a substantial part of the picture and all or a proportion of the global detail signal is used to correct the field difference signal.

10. A method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail in which the field difference signal is summed over all or a substantial part of the picture to create a global difference signal and the local detail from one or both fields is summed over all or a substantial part of the picture to create a global detail signal and a corrected field difference signal is obtained by subtracting all or a proportion of the global detail signal from the global field difference signal.

11. A method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail in which a field difference signal is output for each pixel of the current field.

12. A method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail in which a field difference signal is output for each of a number of regions of the current field.

13. A method of analysing motion between adjacent fields of an interlaced video signal, comprising the steps of vertically interpolating one or both of the fields to produce respective signals for the two fields which correspond in vertical position; subtracting the signals to provide a field difference signal; and removing a component in the field difference signal which arises from vertical detail, in which a single field difference signal is output for the current field.

14. An interpolation process in which an output is created by taking a weighted sum of contributions from one or more selected input fields; comprising the steps of vertically interpolating one or more input fields to produce respective signals for at least two input fields which correspond in vertical position; subtracting the signals to provide a field difference signal for at least one pair of adjacent input fields; and utilising the or each field difference signal to select input fields for interpolation.

15. A process according to claim 14 in which field difference signals are provided for the pair of input fields comprising a current input field and a preceding input field and the pair of input fields comprising the current input field and a succeeding input field.

16. An interpolation process in which an output is created by taking a weighted sum of contributions from one or more selected input fields; comprising the steps of vertically interpolating one or more input fields to produce respective signals for at least two input fields which correspond in vertical position; subtracting the signals to provide a field difference signal for at least one pair of adjacent input fields; and utilising the or each field difference signal to select input fields for interpolation, in which a component in the or each field difference signal which arises from vertical detail is removed by taking a measure of vertical detail from one or more input fields and subtracting either all or a proportion of the detail measure from the or each field difference signal.

17. A video filter process in which an output is created by taking a weighted sum of contributions over a filter aperture which defines the lines and fields from which a contribution is to be taken and the weighting of each contribution; comprising the steps of vertically interpolating one or more input fields to produce respective signals for at least two input fields which correspond in vertical position; subtracting the signals to provide a field difference signal for at least one pair of adjacent input fields; and utilising the or each field difference signal to select a filter aperture.

18. A process according to claim 17 in which field difference signals are provided for the pair of input fields comprising a current input field and a preceding input field and the pair of input fields comprising the current input field and a succeeding input field.

19. A process according to claim 17 in which a component in the or each field difference signal which arises from vertical detail is removed by taking a measure of vertical detail from one or more input fields and subtracting either all or a proportion of the detail measure from the or each field difference signal.

20. A method of automatically changing the operation of a video process between a film mode in which adjacent fields are assumed to correspond to the same point in time and a video mode in which adjacent fields are assumed to correspond to different points in time, comprising the steps of vertically interpolating one or more fields to produce respective signals for at least three input fields which correspond in vertical position; subtracting the signals to provide a preceding field difference signal for the pair of fields comprising a current field and a preceding field and a succeeding field difference signal for the pair of fields comprising the current field and a succeeding field; comparing the preceding field difference signal with the succeeding field difference signal and changing the selection to film mode if the field difference signals are significantly different, and changing the selection to video mode if both signals are similar but not small.

21. A method of video process control according to claim 20 in which the film difference signals are considered to be significantly different if one differs from a multiple of the other by more than a predetermined threshold.

22. A method according to claim 6 in which the field difference signal is summed over all or a substantial part of the picture to create a global difference signal and the local detail from one or both fields is summed over all or a substantial part of the picture to create a global detail signal and a corrected field difference signal is obtained by subtracting all or a proportion of the global signal detail from the global field difference signal.

23. A method according to claim 6 in which a field difference signal is output for each pixel of the current field.

24. A method according to claim 6 in which a field difference signal is output for each of a number of regions of the current field.

25. A method according to claim 6 in which a single field difference signal is output for the current field.

* * * * *